United States Patent
Khoruzhenko et al.

(10) Patent No.: US 9,846,584 B1
(45) Date of Patent: Dec. 19, 2017

(54) PROMOTING A SECURE OPERATING ENVIRONMENT THROUGH OVERSIGHT AND PROVISIONING OF BIOS ACTIVITY

(71) Applicant: Phoenix Technologies Ltd., Milpitas, CA (US)

(72) Inventors: Eugene Khoruzhenko, Redmond, WA (US); James Leonard Mortensen, Lynnwood, WA (US)

(73) Assignee: Phoenix Technologies Ltd., Campbell, CA (US)

( * ) Notice: Subject to any disclaimer, the term of this patent is extended or adjusted under 35 U.S.C. 154(b) by 908 days.

(21) Appl. No.: 14/167,744

(22) Filed: Jan. 29, 2014

(51) Int. Cl.
   *G06F 9/44*      (2006.01)
   *G06F 21/57*     (2013.01)

(52) U.S. Cl.
   CPC .......... *G06F 9/4416* (2013.01); *G06F 9/4406* (2013.01); *G06F 21/57* (2013.01); *G06F 21/575* (2013.01)

(58) Field of Classification Search
   CPC ...... G06F 9/4406; G06F 9/4412; G06F 21/57; G06F 21/575
   See application file for complete search history.

(56) References Cited

U.S. PATENT DOCUMENTS

| | | | | |
|---|---|---|---|---|
| 5,444,850 A * | 8/1995 | Chang | ................... | G06F 9/4416 707/999.2 |
| 5,919,257 A * | 7/1999 | Trostle | .................. | G06F 21/575 726/22 |
| 5,978,912 A * | 11/1999 | Rakavy | ................. | G06F 9/4416 709/222 |
| 6,125,457 A * | 9/2000 | Crisan | ..................... | G06F 21/33 709/225 |
| 6,684,326 B1 * | 1/2004 | Cromer | ................. | G06F 21/575 713/1 |
| 8,392,539 B1 * | 3/2013 | Chen | ..................... | G06F 9/4406 709/220 |
| 9,110,678 B1 * | 8/2015 | Chan | ..................... | G06F 9/4401 |
| 2001/0052069 A1 * | 12/2001 | Sekiguchi | ............. | G06F 9/4416 713/2 |
| 2002/0171546 A1 * | 11/2002 | Evans | ................... | G06F 21/554 340/540 |
| 2008/0120716 A1 * | 5/2008 | Hall | ........................ | G06F 21/88 726/16 |
| 2012/0017271 A1 * | 1/2012 | Smith | ................... | G06F 9/4401 726/19 |
| 2014/0215196 A1 * | 7/2014 | Berlin | ................... | G06F 21/572 713/2 |

* cited by examiner

*Primary Examiner* — Aaron Strange
(74) *Attorney, Agent, or Firm* — Brokaw Patent Law PC; Christopher J Brokaw (57) ABSTRACT

Techniques for selectively permitting a device to boot an operating system. Before any operating system is loaded on the device, a BIOS component analyzes a set of files residing on the device to create state data that describes a current state of the set of files. This enables the state data to identify whether any files have been unexpectedly modified or are outdated. The BIOS component attempts to send the state data to a server over a network. The BIOS component then determines whether to permit the device to boot the operating system based on whether the network was detected and on the contents of any response, sent by the server, responsive to the state data.

17 Claims, 4 Drawing Sheets

PROMOTING A SECURE OPERATING ENVIRONMENT THROUGH OVERSIGHT AND PROVISIONING OF BIOS ACTIVITY

FIELD OF THE INVENTION

The present invention generally relates to the promotion of a secure operating environment by monitoring and provisioning BIOS activities.

BACKGROUND OF THE INVENTION

When a computer is powered on, the computer undergoes an initial set of operations to configure the hardware and software of the computer. This process is generally known as the boot process. A Unified Extensible Firmware Interface (UEFI) standard has been developed by the Unified EFI Forum industry group to enhance the booting process of modern computer systems. However, not all problems in the boot process have been addressed by the UEFI standard and/or current techniques of the art.

SUMMARY OF THE INVENTION

Approaches for selectively permitting a device to boot an operating system are described herein. Before any operating system is loaded on the device, a BIOS component analyzes a set of files residing on the device to create state data that describes a current state of the files in the set. This enables the state data to identify whether any of the files have become unexpectedly modified or outdated. The BIOS component attempts to send the state data to a server over a network. The BIOS component then determines whether to permit the device to boot the operating system based on factors such as whether the network was detected and the contents of any response sent by the server in answer to the state data. The BIOS component may take one or more additional actions to secure the device.

The approaches described herein are not meant to describe all the embodiments of the invention, as other embodiments of the invention may differ in their operation compared to the illustrative approaches discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for selectively permitting a device to boot an operating system are described herein. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Functional Components of an Illustrative Device

Certain embodiments of the invention advantageously provide the user of a device with the peace of mind knowing that the device cannot execute an operating system if the device has either been compromised in some fashion by malicious code or lacks the latest version of a certain software component. The assurance offered by embodiments not only protects the resources of the device from unauthorized access, but also extends to prohibiting unauthorized access to any network resources which may have been accessed using the compromised or outdated device.

Embodiments of the invention may also provide value to an Enterprise or organization by allowing them to prevent the use of devices belonging to them in some cases. For example, if a device is moved outside of an area in which the device is intended to operate or if the device has been flagged as "stolen," then embodiments may cause those devices to be disabled in some fashion.

As shall be explained in detail below, in embodiments the actor which prevents a device from booting an operating system under certain conditions is the BIOS, which is typically stored in a tamper resistant manner on a physical microchip separate from the main hard-disk drive or flash drive. In this way, even if the operating system were to be reinstalled or if a hard-disk drive or flash drive were to be swapped on the device, the BIOS would still be operable to prevent the device from booting any operating system which was not approved by the BIOS. In addition, a set of policies may be consulted to determine whether the BIOS should undertake additional measures designed to promote security and ensure the latest version of software is stored and operating correctly on the device.

Figure 1:
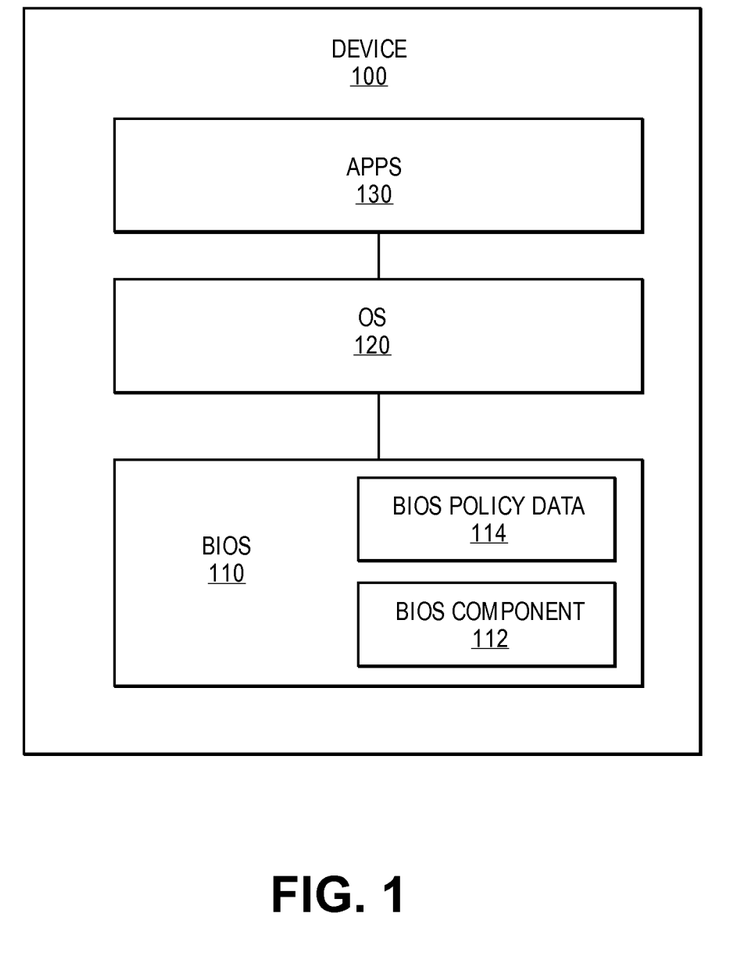
FIG. 1 is a block diagram of the functional components of an illustrative device according to an embodiment of the invention.

Before discussing in further detail how embodiments of the invention operate, it will be helpful to appreciate FIG. 1, which is a block diagram of the functional components of an illustrative device 100 according to an embodiment of the invention. Device 100 may correspond to any device which is capable of executing basic input/output system (BIOS) 110 and operating system 120. Non-limiting, illustrative examples of device 100 include a personal computer (PC), a laptop, a tablet computer, a server, a router, a personal digital assistant (PDA), a cell phone, and a game system (such as an Xbox available from Microsoft Corporation of Redmond, Wash. or a Playstation 3 available from Sony Corporation of Park Ridge, N.J.).

BIOS 110, as broadly used herein, refers to any basic input/output system (BIOS) that is designed to be the boot firmware for device 100 when device 100 is powered on. In an embodiment, BIOS 110 is capable of sending and receiving data over a network. Embodiments of the invention may use any approach for enabling BIOS 110 to communicate over a network, e.g., certain embodiments may enable BIOS 110 to communicate over a network using the approaches for doing so described within U.S. patent application Ser. Nos. 13/764,087, 13/764,313, 13/704,364, 13/764,396, and 13/763,986, each of which was invented by Steven Chan et al. and each of which is hereby incorporated by reference for all purposes as if fully set forth herein.

In an embodiment, BIOS 110 includes BIOS component 112 and BIOS policy data 114. BIOS component 112 is a functional component of BIOS 110 responsible for selectively permitting device 100 to boot operating system 120. In addition, BIOS component 112 may perform certain additional optional actions discussed below. BIOS component 112 may be implemented by a component in a root of trust of BIOS 110; by virtue of BIOS component 112 being in a root of trust with BIOS 110, BIOS 110 trusts the execution of BIOS component 112 without performing any security checks or validations. In an embodiment, BIOS component 112 may be implemented as a driver of BIOS 110 or as the boot manager of BIOS 110.

BIOS policy data 114, as broadly used herein, refers to data consulted by BIOS 110 that describes one or more policies. The policies described by BIOS policy data 114 are used to configure the conduct of BIOS component 112. In an embodiment, the policies described by BIOS policy data 114 may describe activity that should be undertaken when communication cannot be established between BIOS 110 and server 150. The policies described by BIOS policy data 114 may be tailored to accommodate the particular security concerns of an organization or owner, and so the policies described by BIOS policy data 114 are designed to vary from implementation to implementation. The use of BIOS policy data 114 will be described in further detail below in the description of FIG. 2.

Operating system 120, as broadly used herein, refers a collection of software that manages computer hardware resources and provides common services for application programs 130. The meaning of scope of the terms operating system 120 and application programs 130 are well known in the art. Having described the functional components of device 100, additional description about how embodiments may selectively boot an operating system shall now be presented.

Selectively Booting an Operating System

Figure 2:
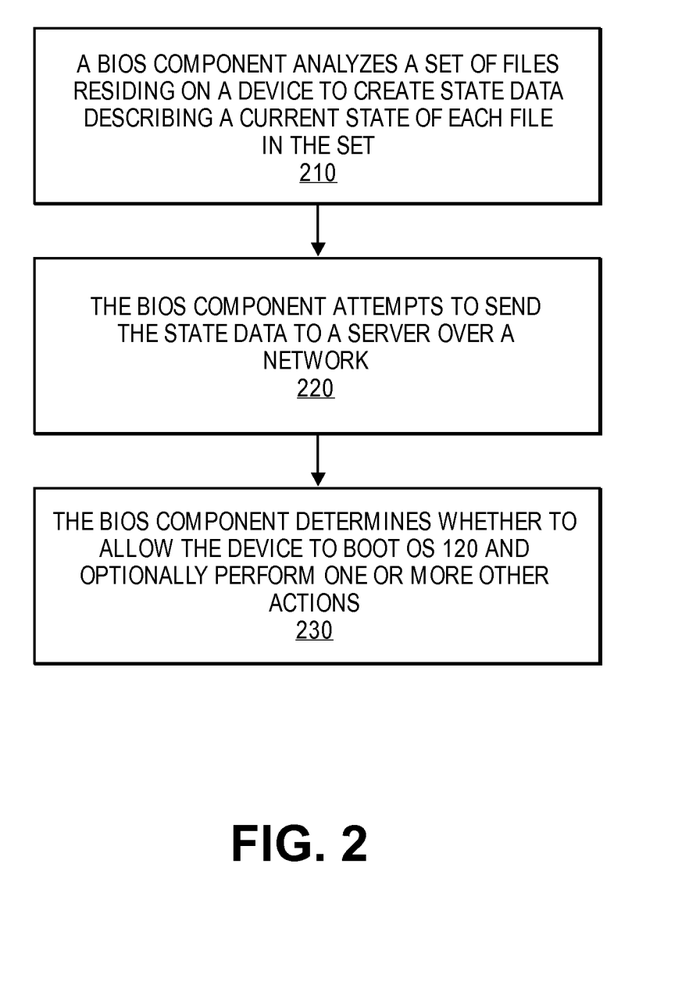
FIG. 2 is a flowchart illustrating the steps of selectively permitting a device to boot an operating system according to an embodiment of the invention.

FIG. 2 is a flowchart illustrating the steps of selectively permitting a device to boot an operating system according to an embodiment of the invention. The steps of FIG. 2 shall be described below with reference to device 100 of FIG. 1.

In step 210, BIOS component 112 analyzes a set of files residing on device 100. The decision of which files on device 100 to analyze in step 210 may be based upon data stored in BIOS component 112 or may be identified by BIOS policy data 114. The files to be analyzed may correspond to the set of files that compose or correspond to one or more of BIOS 110 and operating system 120, although the files that compose or correspond to additional software components may also be analyzed by BIOS component 112. For example, the set of files analyzed in step 210 may include or correspond to applications or security software, such as anti-virus software or a firewall residing on device 100. As another example, the set of files analyzed in step 210 may include files within the file system provided by OS 120.

The purpose of analyzing the set of files in step 210 is to ensure that the files have not been either modified by any malicious parties or rendered outdated. Modification by malicious parties may involve either updating certain configuration settings of the software or the introduction of malicious code, such as a computer virus.

Analysis performed in step 210 may be accomplished using a set of analytics to ascertain the current state of each of the files being analyzed. Any analytics which may be used to determine whether a file is outdated or has been modified in an unauthorized manner may be employed by embodiments. For example, in an embodiment, BIOS component 112 may employ a set of analytics for analyzing files in accordance with the Trusted Computing Group (TCG) standard. In doing so, BIOS component 112 may set Trusted Platform Module (TPM) register values and create a TCG Event Log. Note that different types of BIOS components may be measured to different platform configuration registers (PCR)s. The specifics of the TCG Event Log and BIOS measurements are described in the "TCG EFI Platform Specification" by the Trusted Computing Group (TCG). As a result of BIOS component 112 analyzing the set of files, BIOS component 112 creates data ("state data") that describes a current state of the set of files analyzed by BIOS component 112. For example, the state data may identify which files in the set of files are outdated or have been modified in an unauthorized manner, although state data may need to be interpreted in order to make the identification. State data may be expressed in a variety of different formats. In one embodiment, state data conforms to a standard established by the Trusted Computing Group (TCG). In other embodiments, state data may be embodiments as digital signatures generated for each file analyzed.

Figure 3:
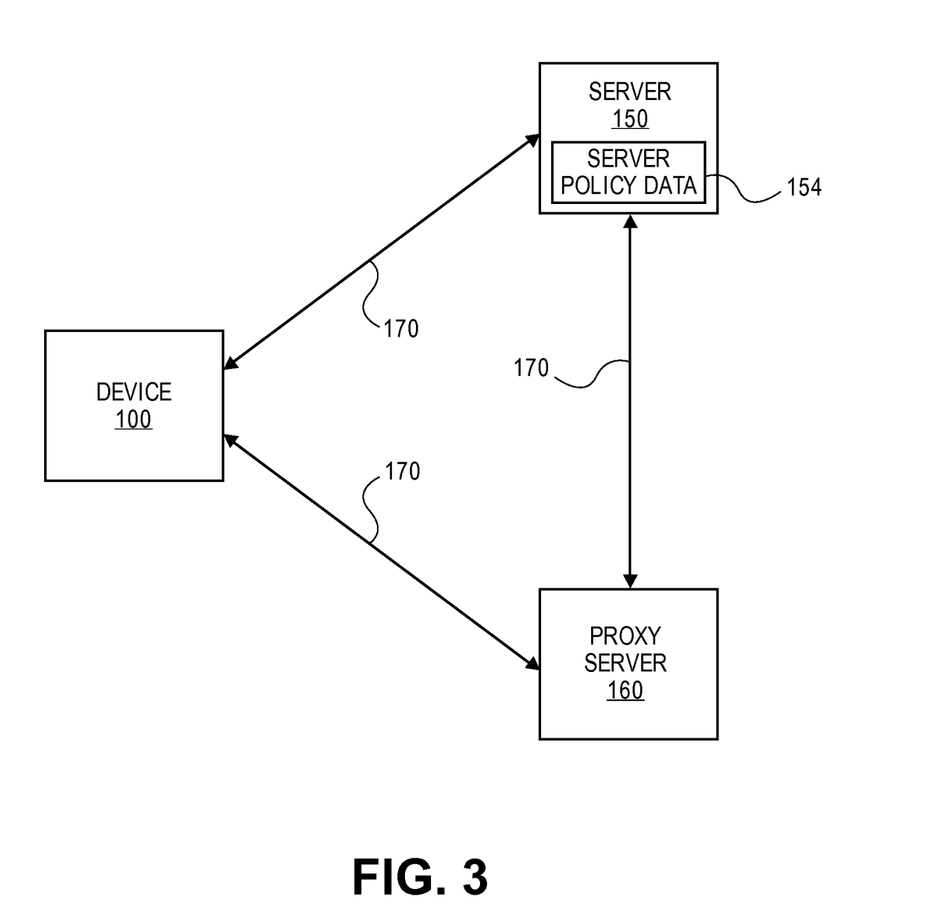
FIG. 3 is a block diagram of an illustrative system according to an embodiment of the invention.

In step 220, BIOS component 112 attempts to send the state data created in step 210 to a server over a network. Step 220 will be explained with reference to FIG. 3, which is a block diagram of an illustrative system according to an embodiment of the invention. FIG. 3 depicts device 100, server 150, server policy data 154, proxy server 160, and communications link 170. Device 100 of FIG. 3 corresponds to device 100 of FIG. 1 discussed above.

Server 150 broadly represents any entity capable of communicating with device 100 over communications link 170, e.g., server 150 may correspond to a single server or a collection of servers designed to interact with one or more device as a cohesive unit for scalability and fault-tolerance purposes. In an embodiment, server 150 may correspond to or perform functions generally associated with a Measurement Assessment Authority (MAA) server.

Server policy data 154, as broadly used herein, refers to data that describes one or more policies consulted by server 150. The policies described by server policy data 154 are used by server 150 when server 150 receives and interprets state data from device 100. After consulting server state data 154, server 150 may instruct BIOS component 112 to perform one or more actions. The policies described by server policy data 154 may be arbitrarily complex. The policies described by server policy data 154 may be tailored to accommodate the particular security concerns of an organization or owner, and so the policies described by server policy data 154 are designed to vary from implementation to implementation.

Proxy server 160 broadly represents any entity capable of facilitating a conversation between device 100 and server 150. Proxy server 160 may be implemented on one or more separate physical machines than server 150 as depicted in FIG. 3. In other embodiments, proxy server 160 may be implemented as a separate set of software services executing on the same physical machine as server 150. Communications link 170 broadly represents any type of medium over which digital data may be communicated, such as a wired network or a wireless network.

As BIOS 110 is capable of sending and receiving data over communications 170, according to one approach for performing step 220, if device 100 detects communications link 170, then BIOS component 112 attempts to send state data to server 150 over communications link 170. BIOS component 112 sends the state data in a format which server 150 understands. For example, the state data may be expressed in an Extended Markup Language (XML).

In certain implementations, it may not be possible or desirable for device 100 to format state data into format which server 150 can understand. Consequently, according to another embodiment, in step 220 BIOS component 112 may cause device 100 to send the state data in a first format (such as a simple log or text based format, for example) to proxy server 160 rather than server 150. Proxy server 160, upon receiving the state data in the first format from device 100, converts the state data from the first format to a second format. For example, proxy server 160 may convert the state data from a simple log format to an XML format. Thereafter, proxy server 160 may send the state data in the second format to server 150. Similarly, upon receipt of a response from server 150 in the second format, proxy server 160 may translate the response from the second format to the first format and forward the response to device 100 over communications link 170.

If BIOS component 112 is unable to transmit the state data to server 150 in step 220 or server 150 is unable to provide BIOS component 112 with a response after a predetermined amount of time, then BIOS component 112 may consult BIOS policy data 114, which defines one or more policies which will instruct BIOS component 112 on how to address the situation. For example, in an embodiment, in the event that device 100 is unable to detect communications link 170, does not receive a response form server 150 after sending server 150 state data, or otherwise unable to send the state data to server 150, a policy in BIOS policy data 114 may instruct BIOS component 112 to power down device 100, periodically check to see if communications link 170 is available before performing a defensive security action (such as disabling device 100), or disabling access to certain software applications 130.

In step 230, BIOS component 112 determines whether to permit device 100 to boot OS 120. Either instructions received by server 150, or BIOS policy data 114 in the case where no instructions are received from server 150, may instruct BIOS component 112 to permit or disallow device 100 to boot OS 120 based on certain conditions. For example, BIOS policy data 114 may disallow device 100 to boot OS 120 if communications link 170 was not detected or if device 100 was not able to receive any responsive communications from server 150. As another example, server 150, in consultation with server state data 154, may instruct BIOS component 112 to prohibit device 100 from booting OS 120 if a policy defined in server state data 154 identifies a problem condition in the state data sent from device 100 to server 150.

In an embodiment, when server 150 receives state data from device 100, server 150 send a response that instructs BIOS component 112 on whether there were any files analyzed in step 210 that do not satisfy a set of heuristics performed by server 150. The set of heuristics may be based upon policies defined by server policy data 154 residing on server 150. The response that BIOS component 112 receives from server 150 may instruct BIOS component 112 on what actions to perform. In this way, such embodiments allows server 150, and by extension the human operators associated therewith, to determine what to do when a problem is detected on device 100.

Other Security Actions Boot Component May Perform

In certain embodiments, in performing step 230, BIOS component 112 may also consult BIOS policy data 114 residing on device 100 to determine whether one or more additional security actions are to be performed. Alternately, server 150, after consulting server policy data 154, may instruct device 100 to perform one or more additional actions based on the state data received from device 100.

In an embodiment, if server 150 determines that one or more files in the set of files analyzed in step 210 are either outdated (i.e., server 150 stores a more recent version of the file) or have been tampered with (i.e., modified in an unauthorized manner) or otherwise corrupted, then server 150 may instruct BIOS component 112 to cause those files to be updated, repaired, or replaced prior to booting OS 120 on device 100. To do so, BIOS component 112 may retrieve new versions of outdated files or replacement copies of tampered or corrupted files from server 150 over communications link 170. Once all files analyzed in step 210 are deemed up-to-date and authenticated, then BIOS component 112 will permit device 100 to boot OS 120. Advantageously, the actions of BIOS component 112 to update, repair, or replace any files deemed outdated, tampered with, or otherwise corrupted is performed without human intervention, and so the software executing on device 100 is ensured to correspond to a clean copy of the most recent version without any manual effort on behalf of the user of device 100.

In another embodiment, server 150, in consultation with server policy data 154, may determine whether to render one or more persistent storage mediums of device 100 inoperable based on the state data received from device 100. Rendering a persistent storage medium of device 100 inoperable may be desirable if malicious code is determined to reside on the persistent storage medium. By rendering the medium inoperable, further infection of device 100 (and by extension any network resource accessible by device 100) may be prevented, while preserving the contents of the persistent storage medium for subsequent analysis, such as to identify the source of the infection and to develop a countermeasure.

In another embodiment, server 150, in consultation with server policy data 154, may determine whether to initialize a persistent storage medium deemed corrupted by malicious code. Initializing a persistent storage medium of device 100 may be desirable if malicious code is determined to reside on the persistent storage medium and subsequent study of the infection is not desired. By initializing the medium, all data persistently stored on the medium may be erased, thereby eliminating any threat to device 100 posed by malicious code residing thereon in a manner that allows device 100 to be used safely again.

In another embodiment, server 150, in consultation with server policy data 154, may determine whether to cause an audio or visual recording device (such as a video recorder or camera) to begin recording. If server 150 determines, in consultation with sever policy data 154, that device 100 has been stolen or used improperly after analyzing state data received from device 100, then server 150 may instruct device 100 to cause, an audio or visual recording device to record audio or video files to evidence how device is currently being used and who is using device 100. Such audio and video files may be subsequently sent to server 150 by device 100 over communications link 170 for use in identifying any malicious activity associated with device 100.

In another embodiment, prior to loading any operating system on device 100, server 150, in consultation with server policy data 154, may determine that a set of one or more files on device 100 does not satisfy a set of heuristics. As a consequence, server 150 may instruct BIOS component 112 to cause an interface to be displayed by device 100. This interface allows a user to communicate with a support center to seek a remedy to the detected problem. The interface may be a text interface or a graphical user interface which allows the user to view information arranged in a manner to assist the user in resolving the problem, e.g., the information may be arranged in a FAQ (frequently asked questions) format or by allowing the user to interactively query answers to common problems stored in a database. Additionally, the user interface may allow the user to interact with a human operator. The human operator may help resolve the problem by authorizing server 150 to provide to device 100 one or more files that satisfies the set of heuristics, thereby allowing device 100 to boot OS 120. The human operator may not authorize server 150 to proceed in this manner unless the use of device 100 authenticates him or herself to the satisfaction of the human operator working with the support center. The human operator may be in the employment of the owner of device 100 (for example, the human operator could be a member of the IT organization of a company) or a third-party (such as a company directed towards providing IT services to other companies).

In another embodiment, prior to loading any operating system on device 100, server 150, in consultation with server policy data 154, may determine that a set of one or more files on device 100 does not satisfy a set of heuristics. As a consequence, server 150 may instruct BIOS component 112 to update, one or more configuration settings of BIOS 110 to a predefined settings before continuing a boot process in accordance with the predefined settings of BIOS 100. For example, a group or organization may decide, for security reasons, to prohibit any computerized device used by members of the group or organization from boot if a flash drive is affixed to a USB port. To that end, the group or organization may desire to prohibit any computerized device used by members of the group or organization unless all USB ports on the device are disabled. This policy may be described by server policy data 154. Server 150 may instruct BIOS 110 on certain policy changes to make in accordance with this policy. In this example, upon server 150 determining that a file containing a file setting of BIOS 110 has been altered to enable one or more USB ports, server 150 may instruct BIOS component 112 to update the configuration settings of BIOS 110 to disable all USB ports. In this way, embodiments of the invention may ensure that device 100 boots an operating system according to a predetermined set of environmental configuration settings. Note that the configuration setting updated in this fashion may be the configuration settings of BIOS 110, OS 120, or software application 130.

Implementing Mechanisms

Figure 4:
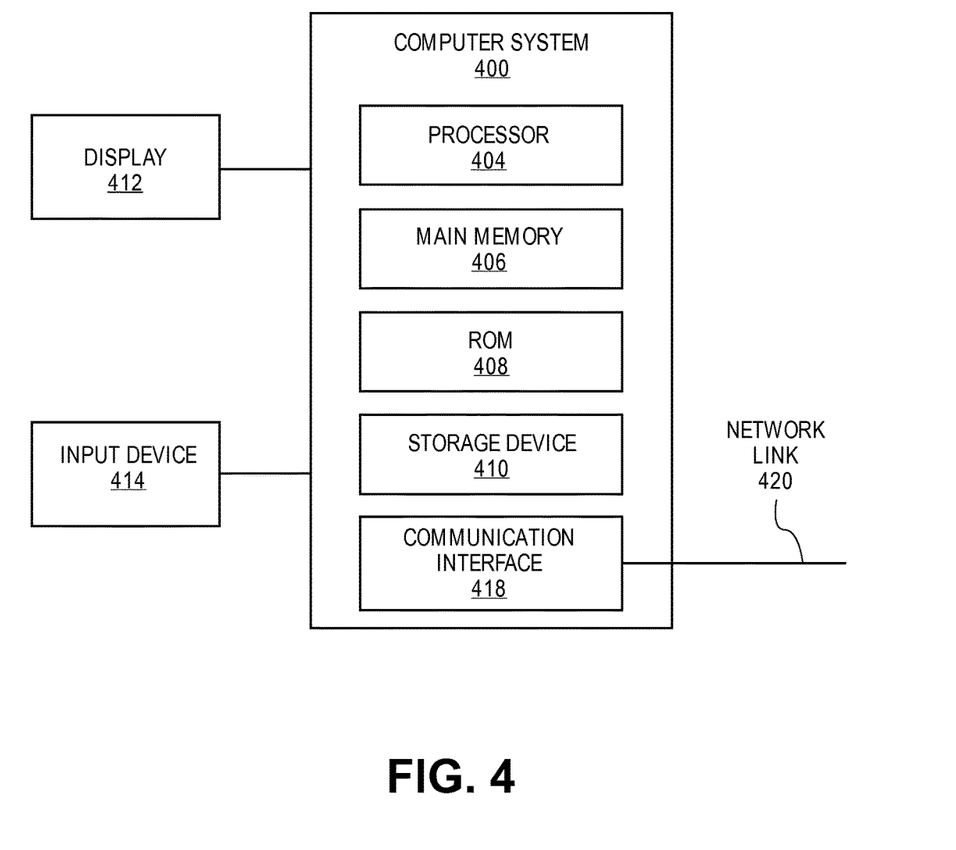
FIG. 4 is a block diagram that illustrates a computer system upon which an embodiment of the invention may be implemented.

FIG. 4 is a block diagram that illustrates a computer system 400 upon which an embodiment of the invention may be implemented. One of more of device 100, server 150, and proxy server 160 may be implemented on a computer system 400. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory machine-readable storage medium storing one or more sequences of instructions, which when executed by one or more processors, cause:
   selectively permitting a device to boot an operating system by performing:
      prior to loading any operating system on the device, a BIOS component (a) analyzing a set of files residing on the device to create state data describing a current state of the set of files, (b) attempting to send the state data over a network to a server, and (c) determining whether to permit the device to boot the operating system based on whether the network was detected and on the content of any response, sent by the server, responsive to the state data,
      wherein the BIOS component is a BIOS driver and in a root of trust of the BIOS.

2. The non-transitory machine-readable storage medium of claim 1, wherein execution of the one or more sequences of instructions further cause:
   the BIOS component consulting policy data to determine whether to update a BIOS residing on the device to a newer version by replacing one or more files stored by the device with a set of updated files retrieved from the server over the network.

3. The non-transitory machine-readable storage medium of claim 1, wherein execution of the one or more sequences of instructions further cause:
   the BIOS component consulting policy data to determine whether to render one or more persistent storage mediums of the device inoperable.

4. The non-transitory machine-readable storage medium of claim 1, wherein execution of the one or more sequences of instructions further cause:
   the BIOS component consulting policy data to determine whether to initialize a persistent storage medium deemed corrupted by malicious code.

5. The non-transitory machine-readable storage medium of claim 1, wherein execution of the one or more sequences of instructions further cause:
   the BIOS component consulting policy data to determine whether to cause an audio or visual recording device to begin recording.

6. The non-transitory machine-readable storage medium of claim 1, wherein the BIOS component attempting to send the state data comprises:
   the BIOS component causing the device to send the state data to a proxy server configured to communicate with the server, wherein the proxy server receives the state data in a first format, converts the state data from the first format to a second format, and sends the state data in the second format to the server.

7. The non-transitory machine-readable storage medium of claim 1, wherein execution of the one or more sequences of instructions further causes:
   prior to loading any operating system on the device, upon the BIOS component determining a set of one or more files on the device does not satisfy a set of heuristics, displaying an interface through which a user may communicate with a support center to seek a remedy.

8. The non-transitory machine-readable storage medium of claim 1, wherein execution of the one or more sequences of instructions further causes:
   prior to loading any operating system on the device, upon the BIOS component determining a set of one or more files on the device does not satisfy a set of heuristics, updating one or more configuration settings of the BIOS to a predefined settings before continuing a boot process in accordance with the predefined settings of the BIOS.

9. An apparatus for selectively permitting a device to boot an operating system, comprising:
   one or more processors; and
   one or more sequences of instructions, which when executed by the one or more processors, cause:
      prior to loading any operating system on the device, a BIOS component (a) analyzing a set of files residing on the device to create state data describing a current state of the set of files, (b) attempting to send the state data over a network to a server, and (c) determining whether to permit the device to boot the operating system based on whether the network was detected and on the content of any response, sent by the server, responsive to the state data,
      wherein the BIOS component is a BIOS driver and in a root of trust of the BIOS.

10. The apparatus of claim 9, wherein execution of the one or more sequences of instructions further cause:
   the BIOS component consulting policy data to determine whether to update a BIOS residing on the device to a newer version by replacing one or more files stored by the device with a set of updated files retrieved from the server over the network.

11. The apparatus of claim 9, wherein execution of the one or more sequences of instructions further cause:
the BIOS component consulting policy data to determine whether to render one or more persistent storage mediums of the device inoperable.

12. The apparatus of claim 9, wherein execution of the one or more sequences of instructions further cause:
the BIOS component consulting policy data to determine whether to initialize a persistent storage medium deemed corrupted by malicious code.

13. The apparatus of claim 9, wherein execution of the one or more sequences of instructions further cause:
the BIOS component consulting policy data to determine whether to cause an audio or visual recording device to begin recording.

14. The apparatus of claim 9, wherein the BIOS component attempting to send the state data comprises:
the BIOS component causing the device to send the state data to a proxy server configured to communicate with the server, wherein the proxy server receives the state data in a first format, converts the state data from the first format to a second format, and sends the state data in the second format to the server.

15. The apparatus of claim 9, wherein execution of the one or more sequences of instructions further causes:
prior to loading any operating system on the device, upon the BIOS component determining a set of one or more files on the device does not satisfy a set of heuristics, displaying an interface through which a user may communicate with a support center to seek a remedy.

16. The apparatus of claim 9, wherein execution of the one or more sequences of instructions further causes:
prior to loading any operating system on the device, upon the BIOS component determining a set of one or more files on the device does not satisfy a set of heuristics, updating one or more configuration settings of the BIOS to a predefined settings before continuing a boot process in accordance with the predefined settings of the BIOS.

17. A method for selectively permitting a device to boot an operating system, comprising:
prior to loading any operating system on the device, a BIOS component:
analyzing a set of files residing on the device to create state data describing a current state of the set of files;
attempting to send the state data over a network to a server; and
determining whether to permit the device to boot the operating system based on whether the network was detected and on the content of any response, sent by the server, responsive to the state data,
wherein the BIOS component is a BIOS driver and in a root of trust of the BIOS.

* * * * *